Sept. 26, 1967  R. A. STUBBS  3,344,283
AMPLIFYING SYSTEM WITH ROLL OFF FREQUENCY AND ROLL OFF
RATE OF AMPLIFIED SIGNAL PREDETERMINED
Filed Aug. 3, 1964  3 Sheets-Sheet 1

REAGH A. STUBBS
INVENTOR.

BY Philip Subkow
ATTORNEY

INVENTOR
REAGH A. STUBBS
BY Philip Subkow
ATTORNEY

United States Patent Office 3,344,283
Patented Sept. 26, 1967

3,344,283
AMPLIFYING SYSTEM WITH ROLL OFF FREQUENCY AND ROLL OFF RATE OF AMPLIFIED SIGNAL PREDETERMINED
Reagh A. Stubbs, Long Beach, Calif., assignor to Statham Instruments, Inc., Los Angeles, Calif., a corporation of California
Filed Aug. 3, 1964, Ser. No. 386,900
6 Claims. (Cl. 307—88.5)

This invention relates to a signal system in which an AC signal, whose frequency may vary from zero i.e. from DC signal, up to a relatively high frequency AC signal.

In many cases, especially where the signal is generated responsive to a periodic condition to be sensed, the amplitude of the signal responsive to the periodic condition may vary with the frequency of the applied condition which results in the AC signal, notwithstanding that the magnitude of the condition applied remains substantially constant.

In many such systems, it is desired to obtain a sensible signal up to a pre-determined frequency, and an unsubstantial signal at a frequency higher than the desired level of frequency. Such signals are said to have been cutoff above the selected pre-determined frequency. For many uses, it is desired that the signal beyond cutoff diminish at a selected rate, i.e. have a roll off of desired rate usually expressed in decibels per octave and which may be made independent of the roll off rate available from the periodic condition when applied to the transducer which generates the signal.

In most cases, it is desirable however, that the signal bear a substantially constant ratio to the magnitude of the applied condition at all frequencies of interest in which the periodic condition is applied up to cut off.

When the signal is a low level signal, and it is desired to amplify the signal, the system of my invention will produce an amplified output signal which will follow the low level signal from zero frequency up to an upper level of frequency which may be pre-determined, and the output signal will then roll off at a pre-determined rate.

In some cases, the amplitude of the low level signal may peak before it rolls off, and it is desirable that the roll off frequency of the amplified signal be at a frequency which will be substantially constant within a pre-selected error band up to the selected roll off frequency notwithstanding any peaking or roll off of the low level signal.

The system of my invention will give an amplified signal which will faithfully follow the low level signal up to a roll off frequency which is less than any frequency at which the low level signal becomes excessively frequency dependent, and will roll off at a rate which is not substantially less and is desirably greater than the roll off rate of the low level signal.

Where the signal is generated by a transducer in which either the static or periodic displacement of a member of the transducer results in a DC signal when the displacement is static, and an AC signal when the displacement is periodic, the magnitude of the displacement of the member, and therefore, the amplitude of signal may depend on the frequency of the applied condition, notwithstanding that the magnitude of the condition remains substantially constant. Such transducers include, for example, accelerometers, vibrometers and phonograph pickups in which a member is displaced responsive to either a force or displacement applied to the transducers.

In many such transducers, for example, accelerometers and vibrometers, the displaced member is a seismic mass which is suspended on a flexible member and is damped. In such seismic system, the output, by careful design, may be made relatively independent of frequency within an acceptable error band up to an acceptable upper limit and then become excessively frequency dependent. It may roll off or it may peak even to the extent of resonance before rolling off. This is accomplished, for example, by employing oil damping in systems such as shown in the Statham Patent No. 2,453,548, and by the selection of a suitable damping ratio and the proper design of the suspension system for the seismic mass.

In the ideal case, when the viscosity of the oil and the elastic modulus of the suspension system employed in the transducer remains constant within an acceptable error band over temperature range of interest, the relative displacement of the mass and reference may be held substantially constant for a given applied displacing force, and then will roll off without first peaking to an undesirable degree. The roll off frequency depends both on the ratio of the stiffness of the suspension to the suspended mass, and on the damping ratio. The stiffness and the damping ratio, especially where damping is by means of an oil whose viscosity changes with temperature, will change with temperature. The viscosity of oil and the elastic modulus of the suspension when metallic, do change with temperature. The signal amplitude which is made responsive to the displacement of the suspended member, becomes frequency dependent, and frequencies lower than the chosen roll off frequency, may be obtained depending on the direction and magnitude of the temperature change. Thus, the roll off frequency and the roll off rate may change with temperature. The frequency at which the amplitude becomes frequency dependent will thus vary with temperature. Other forms of damping where the damping coefficient is a function of temperature, will have similar effects.

A similar but not critical relationship between frequency response and temperature, is present in other types of accelerometers, for example, gas damped accelerometers such as illustrated in the Stedman Patents 2,909,364 and 3,091,971. In such cases, the frequency at which amplitude of the signal is frequency dependent, is also a function of temperature as is the frequency response characteristics, i.e. the signal amplitude as a function of frequency.

Where the displacement results in the low level signal, which is desired to be amplified, temperature may effect the magnitude of the amplified signal as a function of frequency, because of the effect of temperature upon amplification system.

In many cases, it is desired to obtain an amplified signal which will have a pre-determined roll off frequency and have a pre-determined roll off rate which will be stable under expected temperature conditions, and substantially independent of the level of the low level or the amplified signal voltage, and be independent also of any changes in roll off frequency which may occur in the low level signal, and thus also may be employed with various signal sources having various roll off frequencies which are at least as high as the roll off frequency signal source. The above conditions are made particularly difficult of accomplishment in cases such as vibrometers and accelerometers where the signal which is desired to be measured, includes conditions where the frequency of the condition may be zero, i.e. conditions of static displacement of the suspended mass of the vibrometer or accelerometer. In such cases, the output, that is, the bridge unbalance may produce a DC output where the excitation current of the bridge is DC and also AC output.

It is an object of my invention to amplify such periodic signals in such manner that the amplified signal is substantially constant ratio greater than 1 to the low level signal and the amplified signal has a roll off frequency which will be less than the roll off frequency of the low level signal, and then roll off at a pre-determined rate.

It is a further object of my invention, when the amplification system amplifies a signal which itself is substantially constant and substantially independent of frequency up to a roll off frequency of the low level signal, that the amplified signal will be substantially constant and independent of frequency up to a frequency below the roll off frequency of the low level signal, and otherwise independent thereof, and the amplified signal will have a roll off at a pre-determined rate which is the sum of the logarithmic function expressed in decibels per octave. The frequency at which the low level signal rolls off, depends on the nature of the transducer and the damping system employed. See Stedman U.S. Patents 2,909,364 and 3,091,971 and White "Survey of Pickups for Dynamical Physical Measurements" ASTM Special Technical Publication 104 (1950).

Thus, the roll off frequency of the amplified signal may be affected not only by the inherent effects of temperature and amplitude of the signal level, but will also depend on the nature of the transducer and the form of damping which produces the low level signal.

It is an object of my invention to design an amplification system useful with transducers which generate a signal which may have frequencies ranging from zero up to a roll off frequency and, which amplification system may be used with different transducers having different roll off signal frequencies and different roll off rates, and to produce an amplified signal which will be faithfully proportional to the transducer signal up to a pre-determined fixed upper frequency and roll off at a pre-determined rate, notwithstanding that the roll off frequency of the low level signal be at any frequency greater than the pre-determined fixed frequency, notwithstanding that the roll off rate of said transducer signals are each less than the roll off rate, pre-determined as above.

It is another and important characteristic of the system of my invention that the frequency response of the amplification system is not temperature sensitive, that is, that the gain of the system is not temperature sensitive. If the output signal is not temperature sensitive, the temperature will not deleteriously effect the amplified output signal. Thus, if the transducer signal is proportional to the applied force, which produces the signal substantially independent of temperature changes, the amplified signal will also be so faithful responsive.

It is a further object of my invention to design an amplification system such that the frequency response characteristic, that is, the roll off frequency and roll off rate of the amplified signal be pre-determined.

The invention is particularly applicable to amplification of signal produced by damped accelerometers which the readout is an electrical resistance strain gage, for example, unbonded electrical resistance strain gages. Such systems are disclosed, for example, in Statham Patent No. 2,453,548 and the Stedman U.S. Patents 2,909,364 and 3,091,971. The readout is a Wheatstone bridge which is unbalanced by the displacement of the suspended mass. The bridge is excited usually by a stabilized voltage source and the transducer is designed to produce an output which substantially constant, for example, within the narrow band, plus or minus 5% from static response, i.e. at 1 g up to a selected fraction to the natural frequency at which the roll off occurs. The effects of the temperature is minimized by proper design, and may also be compensated by means of zero and span compensation, as is now employed in such unbonded electrical resistance strain gages.

The bridge output may be a substantially constant output within the selected temperature range and for a constant acceleration force applied at frequencies up to the roll off frequency of the signal. This signal is amplified by the system of my invention so that the gain of the system is a constant value substantially independent of the frequency of the applied accelerating force and of the generated bridge unbalance up to a pre-determined roll off frequency, and then roll off at a pre-determined rate, as described above, the roll off frequency and roll off rate being substantially independent of temperature and amplified signal level in the preferred embodiment.

This invention will be further described by reference to the drawings of which:

Figure 1:
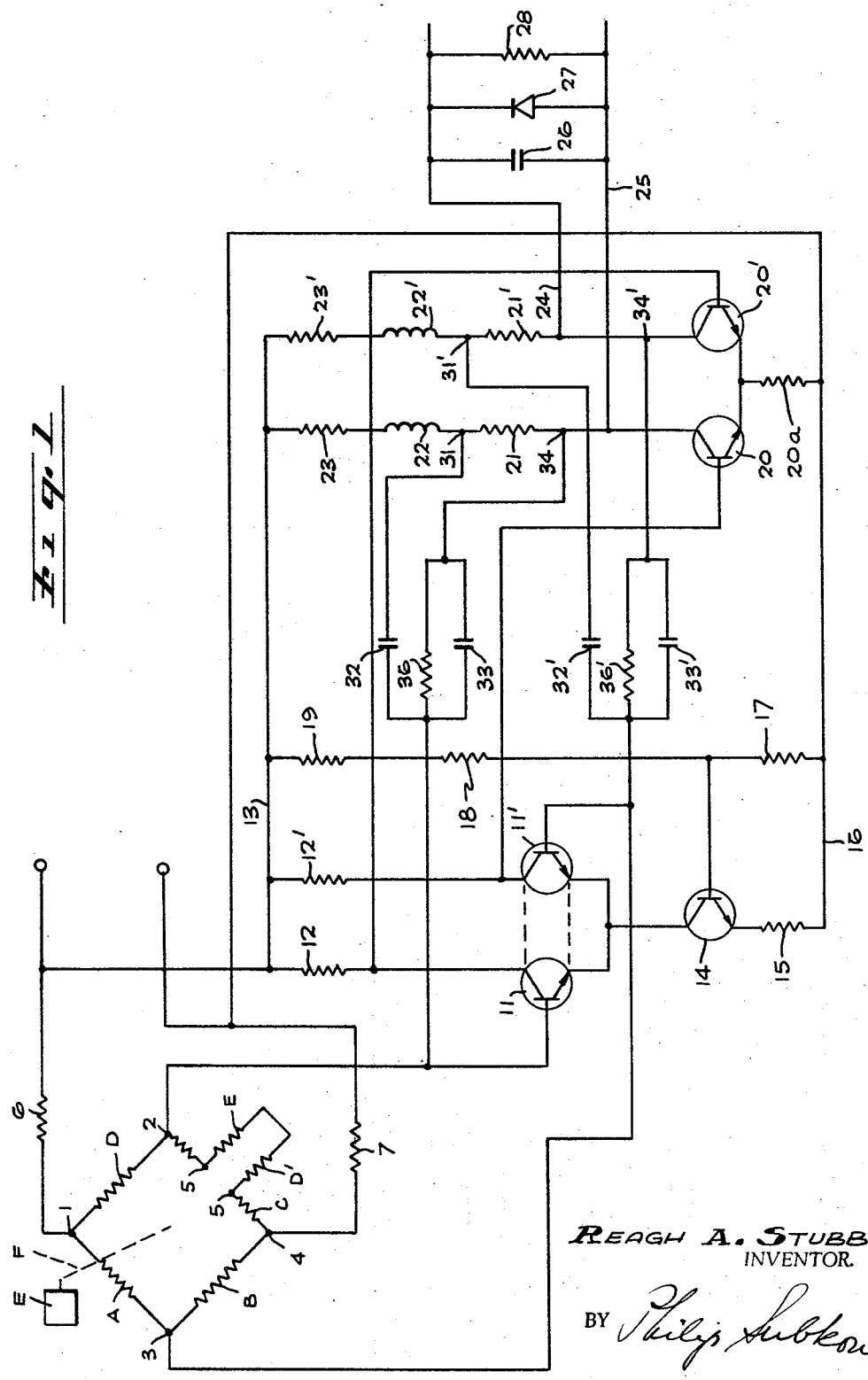
FIG. 1 is a schematic circuit diagram of a preferred form of my invention.

In FIG. 1 the resistance strain gage formed by four strain sensitive resistors A, B, C and D whose resistance is changed by condition imposed on a transducer, for example, an acceleration applied to the transducers of the above Statham and Stedman patents, has input corners 1 and 4 and output corners 2 and 3 illustrated schematically by the block E, and the dotted line F, included to indicate the motion transmitting connection which affects the changes in resistance in the bridge resistances A, B, C and D. The input corners are energized, for example, by a stabilized DC voltage. Leg C of the bridge has balancing resistors and temperature compensating resistors D' and E to produce a bridge balance and to hold a bridge in balance throughout changes in temperatures within the region of interest when the transducer is not accelerated. They are connected in series at 5 as is conventional in this art. The constant excitation voltage is fed through dropping resistors 6 and 7, one of which may be temperature sensitive, to maintain a constant ratio between the applied acceleration force up to a chosen level of such acceleration, and the unbalanced voltage at 2 and 3, substantially independent of ambient temperatures of the accelerometer bridge.

The output at 2 and 3 is applied to the bases of the differential direct coupled (DC) transistors 11 and 11' of the input stage of the amplifier, whose emitters are connected through a common connection to the collector emitter circuit of transistor 14 and to the negative terminal of the excitation source. The collectors of 11 and 11' are connected through the load resistors 12 and 12' to the connecting line 13, connected to the positive input of the excitation source. The base of the common transistor 14 is connected between the lower leg 17 and the upper leg of a voltage divider composed of the resistors 18, and the temperature sensitive resistor 19 whose resistance increases with increase in temperature. The voltage divider is connected between the line 16 connected to the negative of the excitation source and line 13 connected to the positive terminal. Its purpose is to stabilize the DC operating point of the transistors. The output at the collectors of 11 and 11' are fed to the bases of the transistors 20 and 20' of the output stage of the amplifier. The emitters are connected through the common resistor 20a to line 16. The collectors are connected through a voltage divider to line 13. The voltage divider has a lower leg composed of the resistor 21 or 21', and an upper leg composed of the inductance 22 or 22', and a resistance 23 or 23'. The output is taken at 24 and 25 from the collectors of 20 and 20'. Across the outputs are the condenser 26, the zener diode 27 and the resistance 28.

A feedback connection from each of the collectors 20 and 20' connect through resistances 36' and 36, to the opposite output corners of the bridge 2 and 3. The resistors 36 and 36' are each shunted by a noise eliminating condenser 33 and 33'. This feedback connection is a servo loop which acts to maintain the bridge in substantial balance even when the bridge is unbalanced by change in the resistances of A, B, C and D, and would, without feedback, produce DC voltage across the output corners 24 and 25, termed its open loop unbalanced voltage. Thus, if the open loop DC potential at 3 is negative with respect to 2 taken as positive, the feedback connection from 3 is to the collector of 20' which has a DC bias which is positive with respect to the collector of 20'.

Other feedback connections to the bridge to reduce the

DC unbalance, may be used. In this respect, the feedback circuit is like that described in the Price and Curtis application Ser. No. 206,777, filed Feb. 2, 1962 assigned to the assignee of this application, which application is included herein by this reference.

The feedback circuit of my invention includes also, in addition to the direct feedback to the resistors 36 and 36' taken from points 34 and 34' between the collectors of 20 and 20' and the resistors 21 and 21', an AC feedback from 31 and 31' through the capacitors 32 for collector 20, and capacitor 32' for the collector 20'. An additional feedback is taken from an intermediate point on the AC voltage divider whose lower leg is the resistor 21 in the collector emitter circuit of 20, and whose upper leg is the inductance 22 and the resistor 23. In the case of the transistor 20', the upper leg is the inductance 22' and the resistor 23', and the lower leg is the resistance 21'.

Resistors 36 and 36' established the DC gain (G) of the circuit so that the output potential at 24 and 25, i.e. the difference between the DC potential at the collector of 20 ($E_{20}$) and that ($E_{20'}$) at the collector of 20' bears the ratio to the open loop unbalance of the bridge $E_2-E_3$, i.e. the potential difference at 2 and 3 which is nulled by the feedback, to be substantially equal to:

$$G_1 = \frac{E_{20}-E_{20'}}{E_2-E_3} = \frac{R_g+R_{36}+R_{36'}}{R_g} \quad (1)$$

where $R_{36}$ and $R_{36'}$ are the resistance of the inactive resistors 36 and 36', and $R_g$ is the bridge resistance.

In the usual case, the ratio will be greater than 1 and may be up to any value desired. The DC feedback signal is thus proportional to the DC potential of the open loop signal at the output of the bridge between 2 and 3 when thereis no AC generated at the output, and tends to reduce this output to remove the unbalanced voltage resulting from the inequality in the resistances of the bridge arms while an inequality in resistance occurs.

When a periodic force is applied to the transducer, as for example, when the accelerometer undergoes oscillatory motion, an AC output is developed across 2 and 3. There is thus superimposed upon any DC unbalance open loop voltage resulting from the static displacement, an AC voltage resulting from the periodic reversal of the resistance changes in the several arms of the bridge on oscillation of the transducer.

In the absence of the DC voltage divider and the feedback loop through the condensers 32, 33, 32' and 33', the potential at 34 and 34' is a function of the frequency of the low level signal, that is, the AC biased by the DC signal developed at 2 and 3 and also the amplitude of the signal developed at the collectors 20 and 20', the gain of the system and the frequency response characteristics of the AC feedback loop. By designing the AC feedback loop, such that will pass frequencies up to a desired roll off frequency with no substantial attenuation of the amplified signal, i.e. at a substantially constant gain, and then have the amplified signal roll off at the desired rate, the object of my invention will be achieved.

The AC feedback circuit may be considered to be an AC potentiometer with its ends at the supply voltage at 13 and the collector voltage at 20 and 20', with a take-off a 31 and 31'.

When the open loop signal at 2 and 3 is finite, the voltage of the negative DC feedback signal applied between 2 and 3 is such as to bring the bridge back to substantial balance, that is, to remove the unbalance of the open loop signal.

The open loop DC and AC potential which would appear at the bridge outputs 2 and 3 with the feedback disconnected, is in series relation to the source of the feedback signal, such as to reduce and substantially re-move the open loop DC potential, that is, the DC bias and to remove the AC open loop potential. This is accomplished by connecting the collectors of 20 and 20' through the feedback connections to 2 and 3. The collectors are oppositely poled to the output corners 2 and 3. Thus, if 2 is DC positive with respect to 3, the collector of 20' is DC positive with respect to the collector of 20, and to the output corner 3 and collector 20 is negative with respect to 2. In like manner, the AC potential at the collectors of 20 and 20' are 180° out of phase with the open loop AC potential at 2 and 3. The feedback is thus a servo loop removing the open loop error signal resulting from the bridge unbalance occasioned by the changes in the resistance of the bridge arms under the influence of the periodic condition applied to the transducer. This occurs by modifying the pattern of the excitation current so as to make the RI drop in each bridge arm the same, and thus to remove the bridge unbalance resulting from the change of resistances of the arms by the applied acceleration or other condition. The feedback circuit is thus formed of two indepenent loops. One is the loop from 34 and 34' directly through the resistors 36 and 36' which passes both DC and AC through a non-reactive path, and another which passes only AC feedback through a reactive path to the input corners. The shunting condensers 33 and 33' do not introduce any reactive impedance in this feedback loop within frequency spectrum of the AC feedback loop, i.e. at frequency below roll off frequency, as described below.

By choosing the resistors 23 and 23', and the DC resistance of the inductor 22 and 22' to be small as compared with the resistor of 21, the DC and AC component of the signal ($e'_c$) fed back from 34 and 34' through resistors 36 and 36', has a voltage $e_c$ given by equation 1:

$$e' = \frac{e_c R_g}{R_{36}+R_{36'}+R_g} \quad (2)$$

The AC feedback loop from 31 and 31' is more complex. A portion of the AC developed at the collectors passes directly through the resistors 36 and 36', and is independent of frequency as stated above. The other portion of the feedback is taken from 31 and 31' and is dependent upon frequency. The potential of the portion of the feedback signal which is AC is given by the following equation:

$$e'' = \frac{e'_c(R_{23}+jwL)R_g}{(R_{24}+R_{23}+jwL)\left(R_g+\dfrac{1}{jwL}\right)} \quad (3)$$

in which $R_{23}$ is the sum of the resistance of the resistor 23 and 23', L is the sum of the inductances of the coil 22 and 22', $R_{24}$ is the sum of the resistance of resistors 24 and 24', and $R_{23}$ is the sum of the resistance of resistors 23 and 23', $R_g$ is the resistance of the bridge and c is the sum of capacitance of the capacitor 32 and 32', w is the angular frequency equal to $2\pi F$ where F is the frequency in cycles per second, and $j$ is the square root of minus 1. The condensers 33 and 33' do enter into feedback loop.

At the conditions where the frequency approaches zero, the impedance of the inductance 22 and 22' also approaches zero, and no AC signal is present at 31 and 31'. This condition is further enhanced because the impedance of capacitors 32 and 32' approach $\infty$.

As the frequency of $e_c$ is increased, the AC voltage appearing at 31 and 31', ignoring the value of the resistances 23 and 23' as above, the following expressions $$e'' = \frac{e_c jwL}{R_{21}+jwL} \quad (4)$$

The amount of the signal which can be fed back is thus proportionate to the frequency. The amount of signal fed back from 31 and 31′ to 2 and 3 through the capacitors, is given by the following relation:

$$e'' = \frac{e_c'' R_g}{R_g + \frac{1}{jwL}} \qquad (5)$$

There will be some frequency determined by the parameters of 1 and c, and the non-reactive resistors where the output potential $e_c$ for a given open loop signal at 2 and 3 starts to fall, that is, the gain of the system starts to decrease beyond this frequency. This is the frequency roll off and is determined not by the open loop signal but by the value of 1 and c and the values of the non-reactive resistances in the feedback loop.

The system is such that the open loop unbalanced voltage and current is removed by the series feedback which passes DC and AC feedback current in opposition to the unbalance current from Z in an amount substantially equal to the open loop DC and AC current generated by the open loop unbalance of the bridge. This continues up to the roll off frequency determined as above, whereupon the signal output from the amplification system does not bear the above relationship to the unbalanced current at frequencies lower than such roll off frequencies. The roll off rate will be determined by the LC filter and not by the open loop signal, so long as the open loop gain of the amplifier is sufficient and the roll off frequency of the LC circuit is not higher than the roll off frequency of the open loop signal at 2 and 3. The roll off rate is determined by the filter so long as its roll off frequency is at least as great as the roll off rate of the open loop signal at 2 and 3.

The resistors 23 and 23′ are for the purpose of damping the Q of the inductance 22 and 22′ to prevent an excessive reduction of impedance in the LC circuit in the region of the resonance of the LC circuit. The resistor 21 and 21′ is made sufficiently high so as to effectively isolate the LC circuit from the output at the collectors of the transistors 20 and 20′ so that the filter does not load the output. It therefore does not change the output impedance of the amplifier.

The resistor 21 is made sufficiently large so that the impedance associated with the collector voltage has substantially no effect on the roll off frequency established by the feedback circuit. If the resistor 21 is made too low, the roll off frequency becomes dynamically non-linear. Furthermore, if the output impedance at the collector is temperature sensitive, this will affect the roll off frequency which thus becomes a function of temperature. The decoupling effect of resistor 21 aids in stabilizing the roll off frequency so as to substantially reduce and essentially eliminate the dependency of roll off frequency on temperature.

The system is not temperature sensitive since the static currents are biased currents in the amplifier, and are substantially independent of temperature. The L and C parameters are also substantially independent of temperature. The resistors 36 and 36′ are substantially temperature insensitive.

Illustrative of the relation of the components and their effect, the following is given by way of example and not as a limitation of my invention.

The conventional load and bias resistors are assumed to be employed as in the prior art two-stage direct coupled transistorized differential amplifiers. With $R_g$ i.e. the bridge resistance of 350 ohms, and $R_{36}$ and $R_{36'}$ are each equal to 60.4 K, and DC gain of the system is 346 (see Equation 1). The significant parameters of the circuit elements to produce roll off frequencies and cycles per second at the collector of the transistors 20 and 20′ are given in the following table:

TABLE 1

| Roll Off Frequency | 30 c.p.s. | 100 c.p.s. | 500 c.p.s. |
|---|---|---|---|
| $R_{21} = R_{21}'$ | 6.49K | 6.49K | 6.49. |
| $R_{23} = R_{23}'$ at 0.1 watts | 220 ohms | 110 | 510. |
| $L_{21} = L_{21}'$, in Henry's (H) milliamps (ma.) as indicated. | 1.25 at 2 ma | 0.1 at 4 ma | 0.1 at 4 ma. |
| Capacity of Capacitor 32 and 32′ both sums equal in microfarads (mfd.) at 35 volts D.C. | 1.0 | 0.08 | 0.033. |
| Roll off frequency in decibels per octave. | | | |

Figure 2:
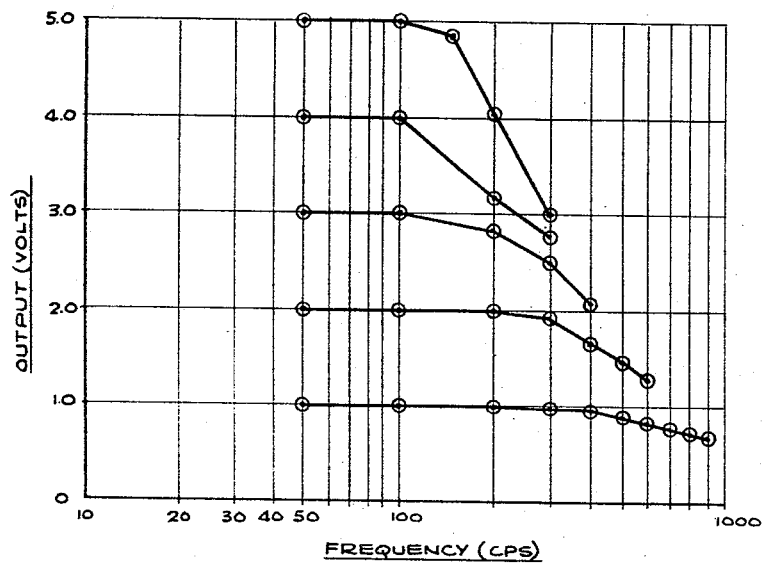
FIGS. 2–5 are charts illustrating my invention.
Figure 3:
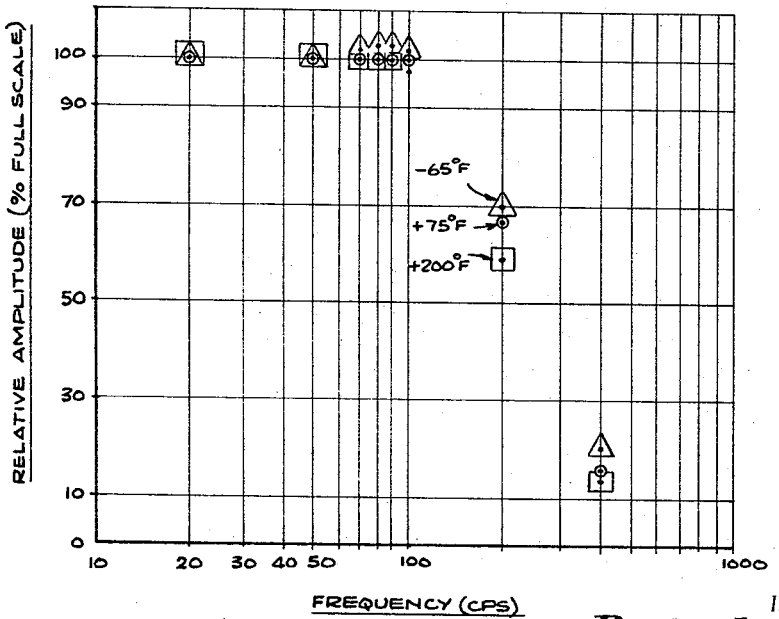
Figure 4:
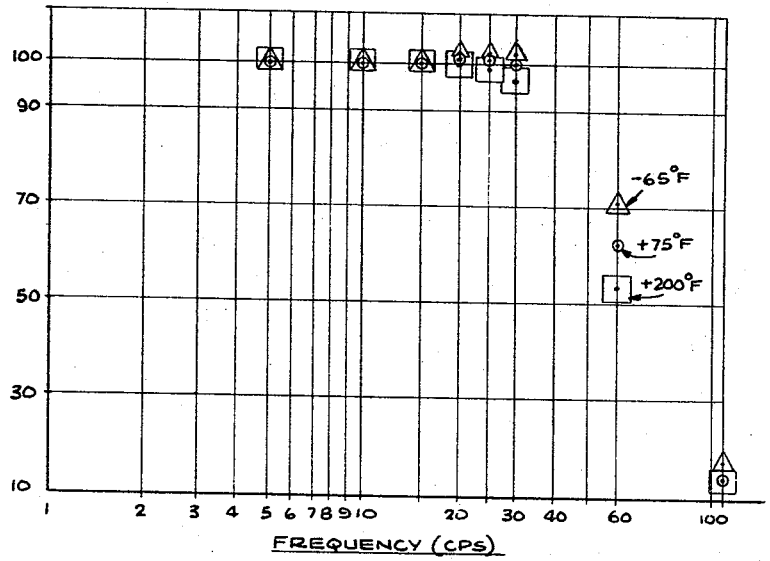
Figure 5:
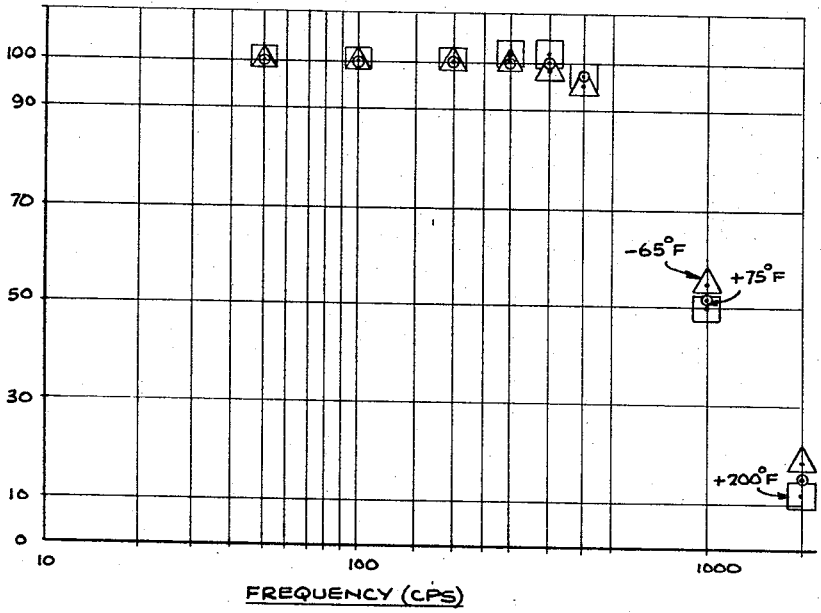

FIGS. 2–4 show the frequency response of the above circuit with roll off at 30, 100 and 500 cycles per second at various temperatures i.e. −65, +75 and +200° F., and shows the excellent temperature stability and frequency response and roll off rate of the circuit. The roll off rate in each case, was at the order of 12 db preoctave. The variations of the output potential at the collectors of 20 and 20′ from 1 to 5 volts have substantially no effect on the roll off frequency or the roll off rate. This may be compared (see FIG. 2), with the response of the same circuit omitting the AC feedback loop composed of the inductances 22 and 22′, the capacitors 32, 32′ and employing normal load resistors on the collector of the transistors and a conventional RC filter at the output between 24 and 25, but employing the feedback resistors 36 and 36′, and if desired, the capacitors 33 and 33′ which have no influence on the roll off. It will be seen that the roll off frequency and the roll off rate becomes strongly dependent on the level of the output at the collectors 20 and 20′. For example, as shown in FIG. 2, the roll off frequency increases and the roll off rate becomes less as the output voltage decreases where the filter feedback of my invention is not used in reducing the open loop voltage at a bridge produced by unbalancing the resistors of the bridge.

Thus, it will be seen by the system of my invention, I may obtain an amplification of a low level signal resulting from such a bridge unbalance which amplified signal becomes frequency dependent, i.e. has a roll off frequency, and I may limit the roll off frequency of the amplified signal to be not substantially greater, and may be, and preferably is substantially less than the roll off frequency of the open loop signal, and is otherwise independent of the roll off frequency of the low level signal, and also has a roll off rate which is not substantially less, and preferably is greater than the roll off rate, and otherwise is independent of the roll off rate of the low level signal. The amplified signal will be stable at temperature variations over substantial range, and be substantially independent of the level of the amplified signal.

While I have described particular embodiments of my invention for the purpose of illustration, it should be understood that various modifications and adaptations thereof may be made within the spirit of the invention, as set forth in the appended claims.

I claim:

1. A transducer including a resistance bridge which is unbalanced at the output of the terminals of said bridge by a periodically applied condition to said transducer, tending to produce a periodic open loop signal responsive to the voltage unbalance of said bridge when said bridge is energized at the input terminals of said bridge, which signal is in magnitude, a frequency-dependent function of the frequency of the applied periodic condition at frequencies higher than the roll off frequency of the open loop signal, means to apply said signal to the input of an amplifier, a negative feedback connection from the output of the amplifier at a first potential level to the output terminals of said bridge, a non-reactive resistance in said feedback path, said resistance being substantially greater than the resistance of said bridge, and a second feedback path from the output of said amplifier at a second potential level to the output terminals of said bridge, an LC filter in said second feedback path, said amplifier producing an amplified output responsive to the open loop signal produced at the output of said bridge by said periodic unbalance up to a roll off frequency of said amplified signal, the roll off frequency of said amplified signal being substantially less than the roll off frequency of said open loop signal.

2. The transducer of claim 1, in which the voltage at said input terminals is a DC excitation voltage.

3. The transducer of claim 1, in which the amplifier is a differential transistorized amplifier and said second feedback path includes an AC voltage divider in the collector-emitter circuit of each of the transistors of the output stage of said amplifier, said AC voltage dividers each having an upper leg including an inductance and a lower leg containing a non-reactive isolating resistance, said second feedback path including also a condenser connected to each of said voltage dividers between the upper and lower legs and to said output terminals of said bridge, and said non-reactive resistance in said second feedback path connected between the collectors of each of the transistors of said output stage and said output terminals of said bridge.

4. In the transducer of claim 3, the collectors of said output stage connected through said non-reactive resistor to an output terminal of said bridge having an opposite DC polarity.

5. The transducer of claim 1, in which the amplifier is a differential transistorized amplifier and said second feedback path includes an AC voltage divider in the collector-emitter circuit of each of the transistors of the output stage of said amplifier, said AC voltage dividers each having an upper leg including and inductance and a lower leg containing a non-reactive isolating resistance, said second feedback path including also a condenser connected to each of said voltage dividers between the upper and lower legs and to said output terminals of said bridge.

6. In the transducer of claim 5, the collectors of said output stage connected through said non-reactive resistor to an output terminal of said bridge having an opposite DC polarity.

References Cited
UNITED STATES PATENTS

| | | | |
|---|---|---|---|
| 2,207,962 | 7/1940 | Werrmann | 330—109 |
| 2,730,618 | 1/1956 | Michaels | 328—3 |
| 2,956,234 | 10/1960 | Olsen | 330—10 |
| 3,144,564 | 8/1964 | Sikorra | 307—88.5 |

ARTHUR GAUSS, *Primary Examiner.*

J. JORDAN, *Assistant Examiner.*